E. CHAQUETTE.
MOTOR TRUCK.
APPLICATION FILED SEPT. 24, 1915.

1,186,648.

Patented June 13, 1916.
3 SHEETS—SHEET 3.

Witnesses:
Jas E Hutchinson
Geo Riley

Inventor:
Ephraiem Chaquette,
By Bacon & Milens Attorneys.

UNITED STATES PATENT OFFICE.

EPHRAIEM CHAQUETTE, OF SADDLE RIVER, NEW JERSEY, ASSIGNOR OF ONE-HALF TO JOHN RATZER, OF SADDLE RIVER, NEW JERSEY.

MOTOR-TRUCK.

1,186,648.

Specification of Letters Patent.

Patented June 13, 1916.

Application filed September 24, 1915. Serial No. 52,393.

*To all whom it may concern:*

Be it known that I, EPHRAIEM CHAQUETTE, a citizen of the United States, residing at Saddle River, in the county of Bergen and State of New Jersey, have invented certain new and useful Improvements in Motor-Trucks, of which the following is a specification, reference being had therein to the accompanying drawing.

This invention relates to motor driven vehicles, and more particularly to that class of vehicles known as auto or motor trucks.

It is one of the primary objects of the invention to provide a positive, and at the same time, a very powerful driving mechanism for trucks of the character just stated, with a reduced number of parts, and incident saving in initial cost of production and expense of upkeep.

In carrying out the invention, it is contemplated to provide a direct and positive driving connection for both the front and rear axles of the vehicle, and to make possible a worm gear drive, the said parts being constructed and arranged in novel operative association with the steering mechanism of improved type, whereby both the driving and steering mechanism accurately and efficiently operate to perform their respective functions without interference one with the other.

A further feature of the invention includes novel and improved means for supporting and steering the front axle of the vehicle whereby to permit of all necessary flexibility of the axle and parts carried thereby in the operation of the vehicle and novel means for positively driving said axle at all times regardless of the movement of the same due to steering or the irregularities in the road bed.

More particularly, the invention includes novel and improved driving mechanism, and novel and improved steering mechanism, said mechanisms being operatively associated one with the other, and the various parts being constructed and arranged with a view to simplicity in design and construction, efficiency in operation, and durability in use.

Still further improvements and novel details in the construction and arrangement of the various parts of the invention will be appreciated from the description to follow, which for a clear understanding thereof is to be considered in connection with the accompanying drawings, forming a part hereof, and wherein is disclosed for the purpose of illustration a convenient and satisfactory embodiment of the invention.

Figure 1:
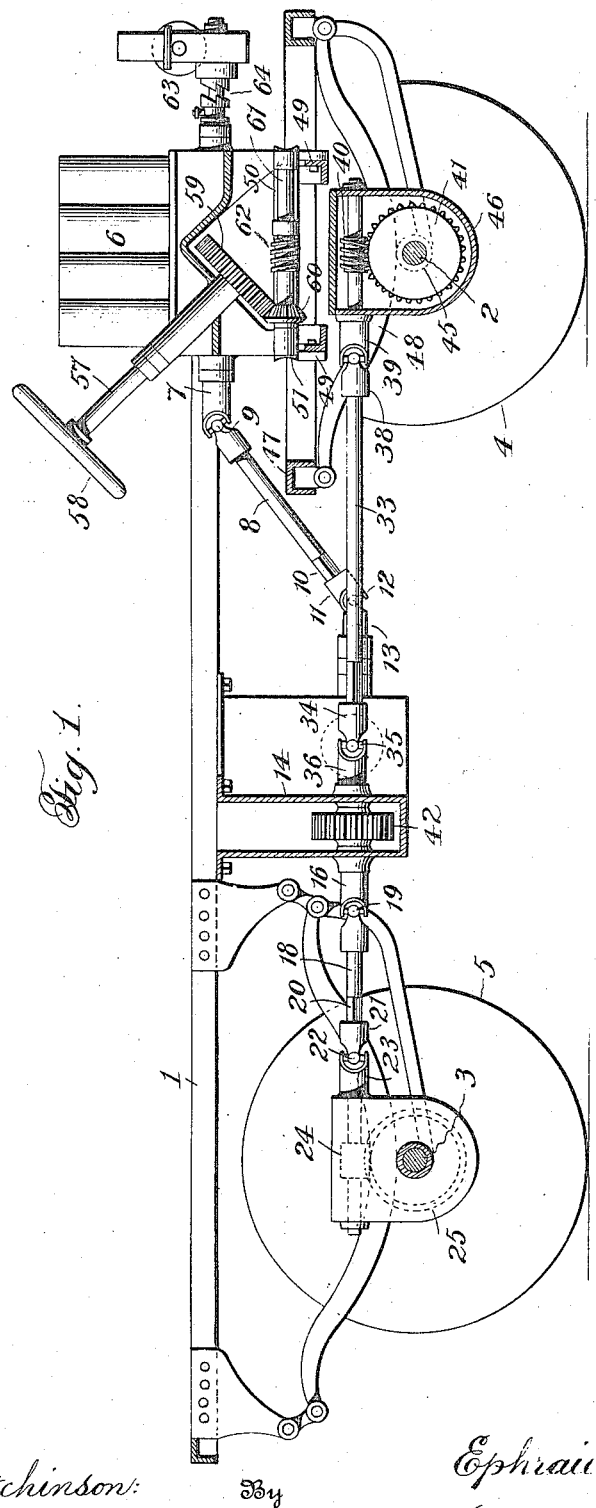
Figure 2:
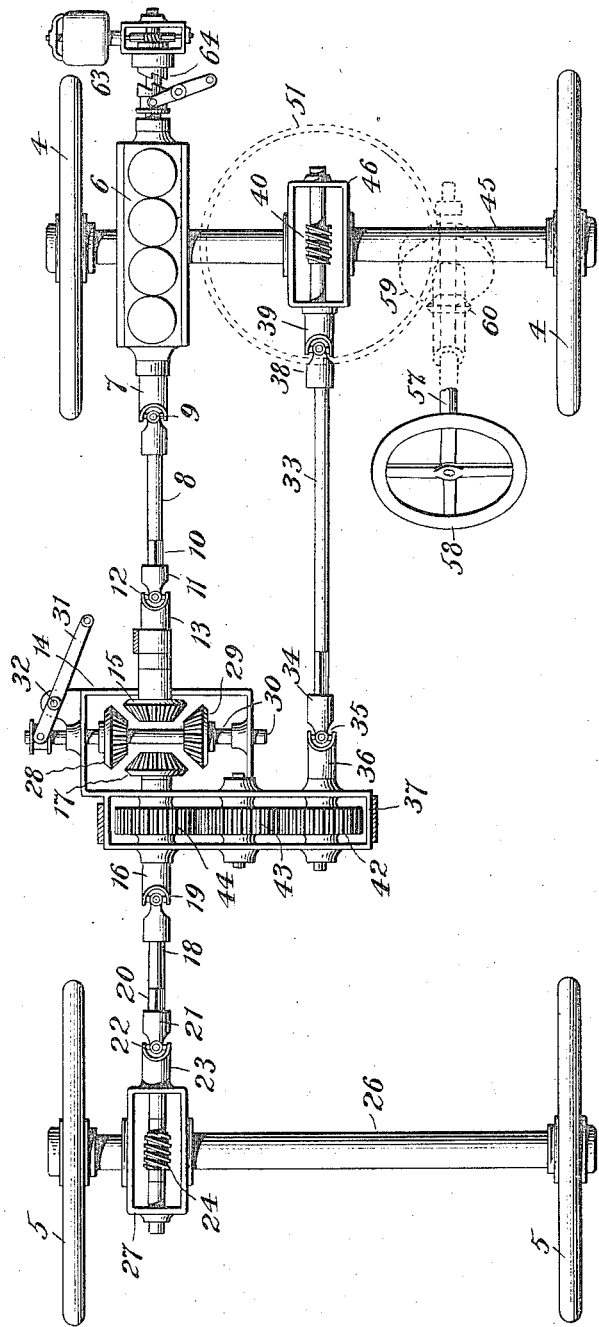
Figure 3:
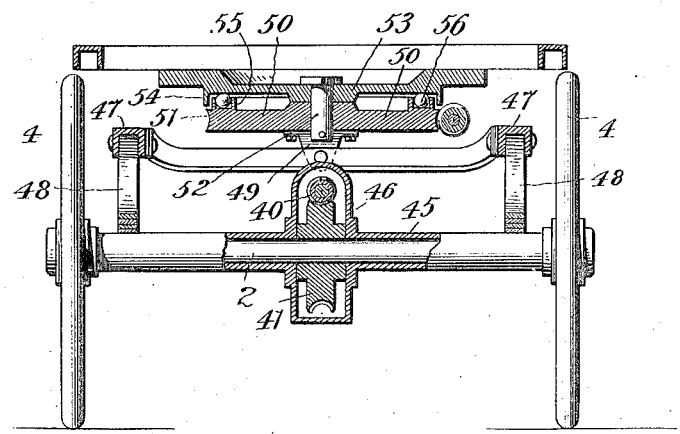
Figure 4:
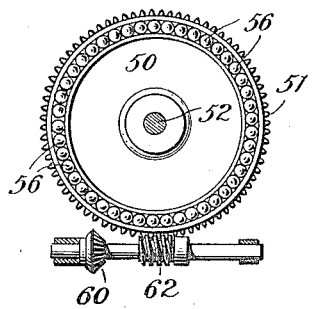

In the drawings:—Figure 1 is a side elevation of a power driven truck with my improvements applied thereto, parts being shown in section. Fig. 2 is a top plan view of the driving mechanism, with certain parts of the steering mechanism. Fig. 3 is a transverse section. Fig. 4 is a detail view of the fifth wheel.

With more particular reference to the drawings, wherein like reference numerals refer to corresponding parts throughout the several views, 1 is a diagrammatic representation of the body of a vehicle, preferably of the truck type, the mechanism to be presently described, being so constructed and arranged that the base of the body is substantially unobstructed, from a point adjacent the engine at the front end of the vehicle to the rear end thereof for the reception of articles to be conveyed.

2 is a front axle and 3 a rear axle, the said axles being preferably of the integral or one piece type and adapted to support the front and rear wheels 4 and 5 respectively.

It is desirable to provide driving mechanism for both the front and rear axles, and because of the uses of vehicles of this character, it is highly important that this drive be a positive and powerful one. In the preferred embodiment of the invention illustrated, a motor 6 of any approved type, but preferably taking the form of a gas engine, is employed, the motor being supported in any desired manner upon the framework of the vehicle at the front thereof and to one side of the center of the front axle 2. This arrangement of the motor is important, in view of the fact that it makes possible the direct driving connection with the center of the axle as will appear from the description hereinafter. An engine or drive shaft 7 projects rearwardly from the motor and conveniently has an extension 8 flexibly connected to the body portion of the shaft 7 in any desired manner as at 9, the extension 8 having a slidable engagement 10 with a coupling member 11 which latter has a flexible connection 12 with a further extension 13. The sections 7 and 13 of the drive shaft preferably extend horizontally whereas the section 8 inclines downwardly from its point of connection with the section 7 to its point of connection with the section 13 which latter has suitable bearing or support in a transmission or gear casing 14 and terminates at its free end in a suitable bevel gear 15. A rear axle transmission shaft 16 projects through an opposite wall of the casing 14 and terminates in a bevel gear 17 adapted to be driven through the drive shaft as will presently appear. The transmission shaft 16 is formed in sections, the part 18 being pivotally connected at 19 and having a slidable engagement 20 with a coupling member 21 pivotally connected at 22 to an extension 23 having thereon a worm 24 adapted to directly engage a worm gear 25 fixed directly to the shaft 3.

26 is a housing for the shaft 3, the same having an enlargement 27 for the reception of the driving connection 24—25 just described.

The rear axle transmission shaft is preferably in horizontal alinement with the rear end of the driving shaft, and the transmission shaft is adapted to be driven in either direction directly from the driving shaft through the medium of bevel gears 28 and 29 respectively mounted upon a suitable slide shaft 30 having bearings in the ends of the casing 14 and projecting at one end beyond one end of the casing whereby to be engaged in any desired manner by an operating member such as a hand lever 31, pivoted at 32, to the casing 14 and adapted in its movement to bring one or the other of the bevel gears 28 and 29 into driving engagement with the bevel gears 15 and 17 of the driving and transmission shafts respectively. It will be appreciated that normally neither of the gears 28 nor 29 will be in engagement with the gears 15 and 17 with the result that regardless of the rotation of the engine or drive shaft 7, the transmission shaft will not operate. When however, the lever 31 is operated to move the shaft 30 in one direction, a bevel gear 28 will operatively engage the gears 15 and 17 whereby to rotate the transmission shaft and the rear axle in one direction, whereas when the lever 31 is moved in an opposite direction this will bring the bevel gear 29 into driving engagement with the gears 15 and 17 to rotate the transmission shaft and the rear axle in an opposite direction. In this manner, the vehicle may be moved either forwardly or rearwardly as desired.

It has been ascertained to be quite important to simultaneously impart driving movement to the front and rear axles, and highly satisfactory results have been obtained by imparting movement to the front axle through the medium of a transmission shaft arranged in substantial horizontal alinement with the rear axle transmission shaft and to drive the front axle transmission shaft through the medium of a gear connection with the rear axle transmission shaft. This preferred construction is well illustrated in Fig. 2 of the drawings, wherein 33 is a front axle transmission shaft, the same having a slidable connection with a coupling 34 which latter is flexibly connected as at 35 with an extension 36 projecting through opposite side walls of a gear casing 37 preferably an integral casting with the casing 14 heretofore described. The forward end of the transmission shaft 33 has a pivotal connection 38 with a forward extension 39 having thereon, a worm 40 adapted for direct engagement with a worm gear 41 fixed upon the front axle at a point midway between the ends of said axle. The arrangement of the motor or engine makes possible this peculiar arrangement and construction of drive centrally of the axle or at a point in vertical alinement with the axis of the fifth wheel of the vehicle to be referred to hereinafter. The front axle transmission shaft 33 receives its movement from, and in the same direction, as the rear axle transmission shaft, through the medium of a gear wheel 42 upon the extension 36 of the front axle transmission shaft, an intermediate gear 43 having suitable bearing in the sides of the casing 37 and a gear 44 fixed upon that section 16 of the rear axle transmission shaft. The gears 42, 43, and 44 are preferably of the same size and in horizontal alinement, and being at all times in mesh, it will be appreciated that so soon as the rear axle transmission shaft is coupled up with the engine shaft, the front axle transmission shaft will be driven thereby and in the same direction. It has been ascertained that this form of driving connection for the front and rear axles is a very powerful and efficient one, more durable than driving mechanisms heretofore employed for the same purpose, and at the same time a minimum number of parts being employed, the structure is comparatively inexpensive, and the expense and upkeep is materially reduced. The forward axle 2 like the rear axle heretofore referred to preferably has mounted thereon a suitable housing 45 having a central enlargement 46 for the worm gear connection 40—41.

Positioned on the housing 45 is a suitable framework 47, the same being spring supported through the medium of suitable springs 48 interposed between the housing 45 and said frame 47. In order to permit the forward axle to have the necessary vertical play, and flexibility, due to an evenness in road for instance, the frame 47 is provided with a pivotal connection or connections, two being illustrated at 49 with the lower surface of a fifth wheel 50 having a peripheral gear 51 and adapted to rotate about a central axis 52 in the form of a bolt or pintle projecting downwardly from the frame 53 of the body part of the vehicle. The part 53 preferably has an annular flange 54 adapted to overlie an annular flange 55 on the upper surface of the fifth wheel, which flange 54 together with the inner concentric flange 55 forms a suitable runway adapted for the reception of bearings 56.

From the construction thus far it will be seen that the pivotal connections 49 between the fifth wheel and spring supported frame 47 are substantially in vertical line with the axle transmission shaft. It will also be seen that the point of driving connection between the worm 40 and gear 41 is in substantial vertical alinement with the central axis 52 of the rotatable fifth wheel, with the result that regardless of the necessary movements of the steering wheels or the supporting axle, due to the steering operation, or to irregularities in the road bed, the worm and gear driving connection will be nevertheless maintained at all times, and neither the steering nor the driving mechanism will interfere with the accurate and positive operation of the other.

A preferred means for imparting rotatable movement to the fifth wheel 50 and in turn to the front axle and parts carried thereby includes an inclined steering shaft 57 having at its upper end a steering wheel 58 and at its lower end a gear wheel 59 adapted to mesh with a bevel pinion 60 mounted upon a shaft 61 and carrying a suitable worm 62 in driving engagement with the peripheral gear 51 of the fifth wheel.

In the preferred embodiment of my invention, I preferably employ automatic means for starting the engine 6, and while any convenient form of automatic starter may be utilized, an electric starter such as diagrammatically illustrated at 63 in the drawings has been found advantageous and satisfactory. Clutch mechanism 64 is interposed between the starter 63 and the engine, to the end that after the operation of the engine has commenced, the driving connection between the starter and the engine may be disengaged.

What is claimed as new is:—

1. In a motor vehicle, the combination of front and rear axles, a motor adjacent to one end of the front axle and above the same, a drive shaft extending rearwardly from the motor, transmission shafts extending in opposite directions and in substantially the same horizontal plane, a gear connection between the drive shaft and said transmission shafts, the transmission shafts having a worm at the outer end thereof, a gear fixed to each axle for direct engagement with said worms, the front axle transmission shaft being arranged substantially midway between the sides of the vehicle, the worm engaging gear on the front axle adapted to be driven by said last mentioned transmission shaft being arranged midway between the ends of said front axle, and said front axle being adapted to swing about an axis in substantial alinement with said worm engaging gear.

2. In a motor driven vehicle, the combination of front and rear axles, the front axle having a worm gear fixed directly thereto substantially centrally thereof and the rear axle having a worm gear fixed directly thereto to one side of the center thereof, means for supporting the axle for swinging movement about a center in substantial alinement with its worm gear, a motor supported at a point overlying the front axle and to one side of the center thereof, an engine shaft projecting rearwardly from the motor, a rear axle transmission shaft having a worm to engage the worm gear of said rear axle, an operative connection between the engine and transmission shaft, a front axle transmission shaft arranged to one side of the rear axle transmission shaft and in substantial horizontal alinement therewith, said front axle transmission shaft having a worm to engage the worm gear of the front axle, and a gear connection between the front and rear axle transmission shafts.

3. In a motor driven vehicle, the combination of front and rear axles, the front axle having a worm gear fixed directly thereto substantially centrally thereof and the rear axle having a worm gear fixed directly thereto to one side of the center thereof, a motor supported adjacent the front axle and thereabove to one side of the center thereof, an engine shaft projecting rearwardly from the motor, a rear axle transmission shaft having a worm to engage the worm gear of said rear axle, an operative connection between the engine and transmission shaft, a front axle transmission shaft arranged to one side of the rear axle transmission shaft and in substantial horizontal alinement therewith, said front axle transmission shaft having a worm to engage the worm gear of the front axle, a gear wheel fixed upon the front axle transmission shaft, a gear wheel fixed directly upon the rear axle transmission shaft, and intermediate connected gear wheels to engage both transmission shaft gear wheels to move the same in reverse directions at will.

4. In a motor driven vehicle, the combination of front and rear axles, the front axle having a worm gear fixed directly thereto substantially centrally thereof and the rear axle having a worm gear fixed directly thereto to one side of the center thereof, a motor supported adjacent the front axle and thereabove to one side of the center thereof, an engine shaft projecting rearwardly from the motor, a rear axle transmission shaft having a worm to engage the worm gear of said rear axle, an operative connection between the engine and transmission shafts, a front axle transmission shaft arranged to one side of the rear axle transmission shaft and in substantial horizontal alinement therewith, said front axle transmission shaft having a worm to engage the worm gear of the front axle, a gear wheel fixed upon the front axle transmission shaft, a gear wheel fixed directly upon the rear axle transmission shaft, an intermediate gear wheel directly engaging both transmission shaft gear wheels, said driving connection between the engine shaft and rear axle transmission shaft including reversing mechanism whereby the axles may be moved in either direction at will.

5. In a motor vehicle, the combination of front and rear axles, a motor adjacent to and to one side of the center of the front axle, a drive shaft extending rearwardly from the motor, transmission shafts extending in opposite directions and in substantially the same horizontal plane, a gear connection between the drive shaft and said transmission shafts, the transmission shafts having a worm at the outer end thereof, and a gear fixed to each axle for direct engagement with said worms, and clutching means interposed in said gear connection permitting the transmission shafts to impart reverse movements to the axles.

6. In a motor vehicle, the combination of front and rear axles, the front axle having fixed thereon, at the center a worm gear, a transmission shaft having fixed thereon a worm to engage said gear, a rear axle having fixed thereon, a worm gear, a rear axle transmission shaft having fixed thereon adjacent its rear end a worm to engage said gear, a gear connection between said transmission shafts, a motor arranged above the front axle to one side of its center, a shaft projecting rearwardly from the motor, and a differential gear connection between the motor shaft and the rear axle transmission shaft.

7. In a motor vehicle, the combination of front and rear axles each having a worm gear directly thereon, a motor adjacent the front axle, a drive shaft projecting rearwardly from the motor and having at its rear end a gear, a rear axle transmission shaft having at its inner end a gear, a transverse slidable shaft arranged between said gears and having a gear fixed thereon adapted in the slidable movement of the transverse shaft to be brought into and out of driving connection with the adjacent gears on the drive and transmission shafts respectively, a worm on said transmission shaft to engage the worm gear of the rear axle, a front axle transmission shaft having at its forward end a worm to engage the worm gear of the front axle, and means for driving the transmission shafts from one another including a gear mounted directly on each and an intermediate intermeshing gear.

8. In a motor vehicle, the combination of front and rear axles, the front axle having a worm gear arranged centrally thereon, and the rear axle having a worm gear arranged to one side of the center thereof, a motor adjacent the front axle and to one side of the center thereof, a drive shaft projecting rearwardly from the motor and having at its rear end a bevel gear, a rear axle transmission shaft having at its inner end a bevel gear, a transverse slidable shaft arranged between said bevel gears and having a plurality of bevel gears fixed thereon adapted in the sliding movement thereof to be brought alternately into and out of driving connection with the bevel gears on the drive and transmission shafts, a worm on said transmission shaft to engage the worm gear of the rear axle, a front axle transmission shaft having at its inner end a worm to engage the worm gear of the front axle, and means for driving the transmission shafts from one another including a gear mounted directly on each, and an intermediate intermeshing gear.

9. In a motor vehicle, the combination of a continuous front axle, a housing therefor, a spring supported frame mounted on the housing, a fifth wheel having a peripheral gear and mounted for rotatable movement about a central axis, a pivotal connection between the fifth wheel and said spring supported frame, a worm gear arranged centrally on the axle and fixed directly thereto, and a power driven worm having operative engagement with said worm gear at a point in substantial vertical alinement with the axis of the fifth wheel.

10. In a motor vehicle, the combination of a continuous front axle, a housing therefor, a spring supported frame mounted on the housing, a fifth wheel having a peripheral gear and mounted for rotatable movement about a central axis, a pivotal connection between the fifth wheel and said spring supported frame, a rigid frame, bearings interposed between the rigid frame and fifth wheel, and overlapping annular flanges on the fifth wheel and rigid frame forming a housing for the bearings, a worm gear arranged centrally on the axle and fixed directly thereto, a transmission shaft having a worm arranged in a space between the front axle and the spring supported frame and adapted to engage said worm gear at the top thereof in substantial vertical alinement with the axis of the fifth wheel.

11. In a motor vehicle, the combination of a front axle, having fixed thereto at the center a worm gear, a transmission shaft having at its forward end a worm to engage said worm gear, a rear axle having a worm gear fixed thereto to one side of the center thereof, a shaft for the motor, a differential gear connection between said motor shaft and the rear transmission shaft, a fifth wheel mounted upon an axis in substantial vertical alinement with the front axle worm gear, connection between the fifth wheel and front axle, and means for rotating the fifth wheel.

12. In a motor driven vehicle, the combination of front and rear axles, the front axle having a worm gear fixed directly thereto substantially centrally thereof and the rear axle having a worm gear fixed directly thereto to one side of the center thereof, a motor supported adjacent the front axle and thereabove to one side of the center thereof, an engine shaft projecting rearwardly from the motor, a rear axle transmission shaft having a worm to engage the worm gear of said rear axle, an operative connection between the engine and transmission shafts, a front axle transmission shaft and in substantial horizontal alinement therewith, said front axle transmission shaft having a worm to engage the worm gear of the front axle, a gear connection between the front and rear axle transmission shafts, a housing for the front axle shaft, a spring supported frame mounted on the housing, a fifth wheel mounted for rotatable movement, and a pivotal connection between the fifth wheel and spring supported frame substantially in vertical alinement with said worm of the front axle transmission shaft.

13. In a motor vehicle, the combination of front and rear axles, transmission shafts having a worm and gear driving connection with the front and rear axles and a gear connection with each other, a motor, a driving connection between the motor and one of said transmission shafts, a housing for the front axle, a spring supported frame mounted on the housing, a fifth wheel mounted for rotation about an axis, a pivotal connection between the spring supported frame and fifth wheel, the worm and gear drive for the front axle being substantially in vertical alinement with the axis of the fifth wheel, and the pivotal connection for the spring supported frame being in vertical alinement with the worm of the front axle transmission shaft.

In testimony whereof I hereunto affix my signature in the presence of two witnesses.

EPHRAIEM CHAQUETTE.

Witnesses:
LESLIE D. FORMAN,
SADIE M. STURR.